United States Patent
Richard

(10) Patent No.: US 10,306,823 B1
(45) Date of Patent: Jun. 4, 2019

(54) SEEDING OPENER SYSTEM

(71) Applicant: Farren W. Richard, Lefor, ND (US)

(72) Inventor: Farren W. Richard, Lefor, ND (US)

(*) Notice: Subject to any disclaimer, the term of this patent is extended or adjusted under 35 U.S.C. 154(b) by 0 days.

(21) Appl. No.: 15/957,239

(22) Filed: Apr. 19, 2018

(51) Int. Cl.
*A01B 35/26* (2006.01)
*A01C 5/06* (2006.01)
*A01B 15/02* (2006.01)
*A01C 7/20* (2006.01)

(52) U.S. Cl.
CPC .............. *A01C 5/062* (2013.01); *A01B 15/02* (2013.01); *A01B 35/26* (2013.01); *A01C 7/206* (2013.01)

(58) Field of Classification Search
CPC ........... A01C 5/06; A01C 5/062; A01B 15/02; A01B 15/025; A01B 15/04; A01B 35/26
See application file for complete search history.

(56) References Cited

U.S. PATENT DOCUMENTS

| | | | | |
|---|---|---|---|---|
| 976,518 A | * | 11/1910 | Stanza | A01B 35/26 172/721 |
| 1,574,917 A | * | 3/1926 | Mitchell | A01C 5/062 111/150 |
| 3,152,649 A | * | 10/1964 | Arnold | A01B 35/26 172/192 |
| 4,259,912 A | | 4/1981 | Stocks | |
| 4,583,599 A | * | 4/1986 | Anderson | A01B 35/26 172/730 |
| 4,762,075 A | | 8/1988 | Halford | |
| 4,779,686 A | * | 10/1988 | Ryan | A01B 35/225 172/730 |
| 4,926,767 A | | 5/1990 | Thomas | |
| 5,161,472 A | | 11/1992 | Handy | |
| 5,309,852 A | | 5/1994 | Zimmerman | |
| 8,079,316 B2 | | 12/2011 | Hall | |

FOREIGN PATENT DOCUMENTS

| | | |
|---|---|---|
| CN | 204948685 U | 1/2016 |
| CN | 105230188 B | 7/2017 |
| EP | 0117745 A1 | 9/1984 |
| WO | WO9716954 A1 | 5/1997 |

\* cited by examiner

*Primary Examiner* — Alicia Torres
(74) *Attorney, Agent, or Firm* — Neustel Law Offices

(57) ABSTRACT

A seeding opener system which allows seeds or other particulate materials to be spread at an appropriate depth with minimal disruption of the ground surface. The seeding opener system generally includes an implement which is driven by a tractor. A cutter extends from the implement which includes a blade adapted to cut into the ground surface beneath the implement. The cutter is adjustable so as to lower the blade to a desired depth beneath the ground surface, or raise the blade above the ground surface when not in use. The blade includes a configuration which ensures that soil backfills over the blade to minimize disturbance of the ground surface during seeding operations. A deflector on the lower end of the blade ensures that seeds are uniformly distributed beneath the ground surface when in use.

13 Claims, 14 Drawing Sheets

US 10,306,823 B1

SEEDING OPENER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a seeding opener system which allows seeds or other particulate materials to be spread at an appropriate depth with minimal disruption of the ground surface.

Related Art

Any discussion of the related art throughout the specification should in no way be considered as an admission that such related art is widely known or forms part of common general knowledge in the field.

Agricultural seeding has been performed for millennia. As agriculture has evolved, so have methods of planting seeds. Typically, seeds are planted in rows which are dug in the ground surface. Seeds are dispersed beneath the ground surface by seed openers. These seed openers open up the ground surface to form troughs in which the seeds may be distributed.

However, such preexisting systems are known to cause major disruption of the ground surface. Existing seed openers leave considerable debris around the troughs which can affect the number of seeds able to be planted in a field. It would be preferable to utilize a seed opener which has minimal impact on the ground surface, and thus does not leave a wide trough or other disrupted soil after seeds have been distributed.

SUMMARY

An example embodiment is directed to a seeding opener system. The seeding opener system includes an implement which is driven by a tractor. A cutter extends from the implement which includes a blade adapted to cut into the ground surface beneath the implement. The cutter is adjustable so as to lower the blade to a desired depth beneath the ground surface, or raise the blade above the ground surface when not in use. The blade includes a configuration which ensures that soil backfills over the blade to minimize disturbance of the ground surface during seeding operations. A deflector on the lower end of the blade ensures that seeds are uniformly distributed beneath the ground surface when in use.

There has thus been outlined, rather broadly, some of the embodiments of the seeding opener system in order that the detailed description thereof may be better understood, and in order that the present contribution to the art may be better appreciated. There are additional embodiments of the seeding opener system that will be described hereinafter and that will form the subject matter of the claims appended hereto. In this respect, before explaining at least one embodiment of the seeding opener system in detail, it is to be understood that the seeding opener system is not limited in its application to the details of construction or to the arrangements of the components set forth in the following description or illustrated in the drawings. The seeding opener system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
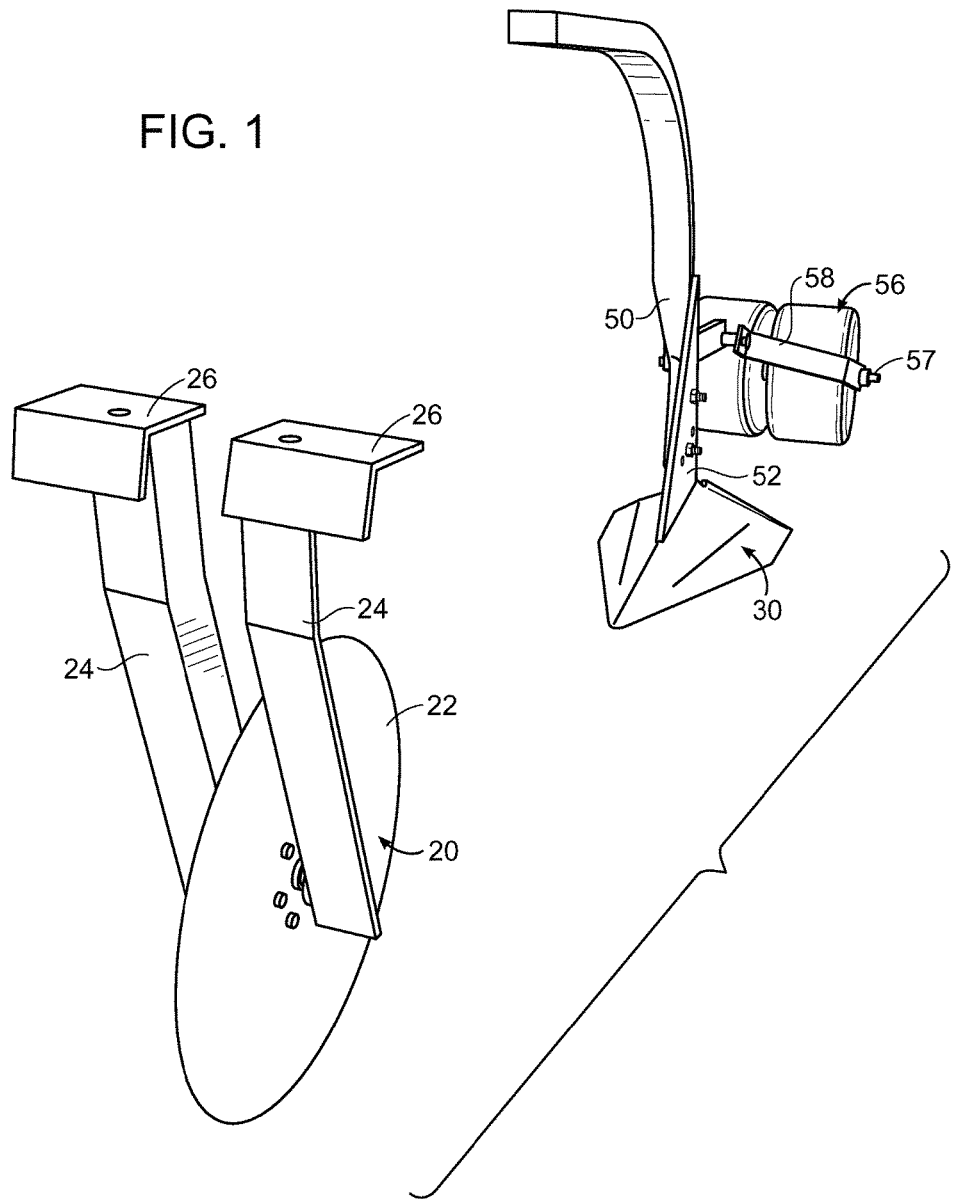
FIG. 1 is a perspective view of a seeding opener system in accordance with an example embodiment.

An example cutter 30 for a seeding opener system 10 generally comprises a blade 31 comprising an upper end 36, a lower end 37, a front end 32, a rear end 33, a first side 34, and a second side 35; with the blade 31 being adapted to be driven below a ground surface so as to cut the ground surface. The blade 31 may include a first front face 38 near the first side 34 of the blade 31, wherein the first front face 38 extends from the front end 32 of the blade 31 toward the rear end 33 of the blade 31. The first front face 38 may comprise a first cutting edge 40; with the first cutting edge 40 extending angularly along a first side 34 of the blade 31. The blade 31 may include a second front face 39 near the second side 35 of the blade 31; with the second front face 39 extending from the front end 32 of the blade 31 toward the rear end 33 of the blade 31. The second front face 39 may comprise a second cutting edge 41; the second cutting edge 41 extending angularly along a second side 35 of the blade 31. The front faces 38, 39 may be substantially triangular.

A cutter support 50 may extend upwardly from an upper end 36 of the blade 31 such that the blade 31 may be fully submerged beneath the ground surface to as to cut into the ground surface. The blade 31 may include an upper opening 46 for receiving a first conduit 15 and a rear opening 47 for receiving a second conduit 15.

The cutter 30 may also include a deflector 48 on the lower end 37 of the blade 31. The deflector 48 may comprise a triangular projection extending downwardly from the lower end 37 of the blade 31. The deflector 48 may be positioned midway between the sides 34, 35 of the blade 31. The first cutting edge 40 may converge with the second cutting edge 41 of the blade 31 to form a point. The blade 31 may also include a first rear edge 44 extending from the first side 34 of the blade 31 at the rear end 33 of the blade 31 and a second rear edge 45 extending from the second side 35 of the blade 31 at the rear end 33 of the blade 31. The first and second rear edges 44, 45 may converge to form a point. The blade 31 may include a rear opening 47 defined by the first and second rear edges 44, 45.

Also disclosed is a seeding system 11 comprising an implement 14 adapted to traverse a ground surface, a seed disc opener 20 connected to the implement 14, a cutter 30 as described above connected to the implement 14 behind the seed disc opener 20, and a wheel assembly 56 connected behind the cutter 30. A seed conduit 15 may be adapted to distribute a plurality of seeds 19 beneath the lower end 37 of the blade 31 when the blade 31 is submerged beneath the ground surface. The blade 31 may include an upper opening 46 and/or a rear opening 47 for receiving various conduits, including a seed conduit 15.

B. Seeding System

Figure 15:
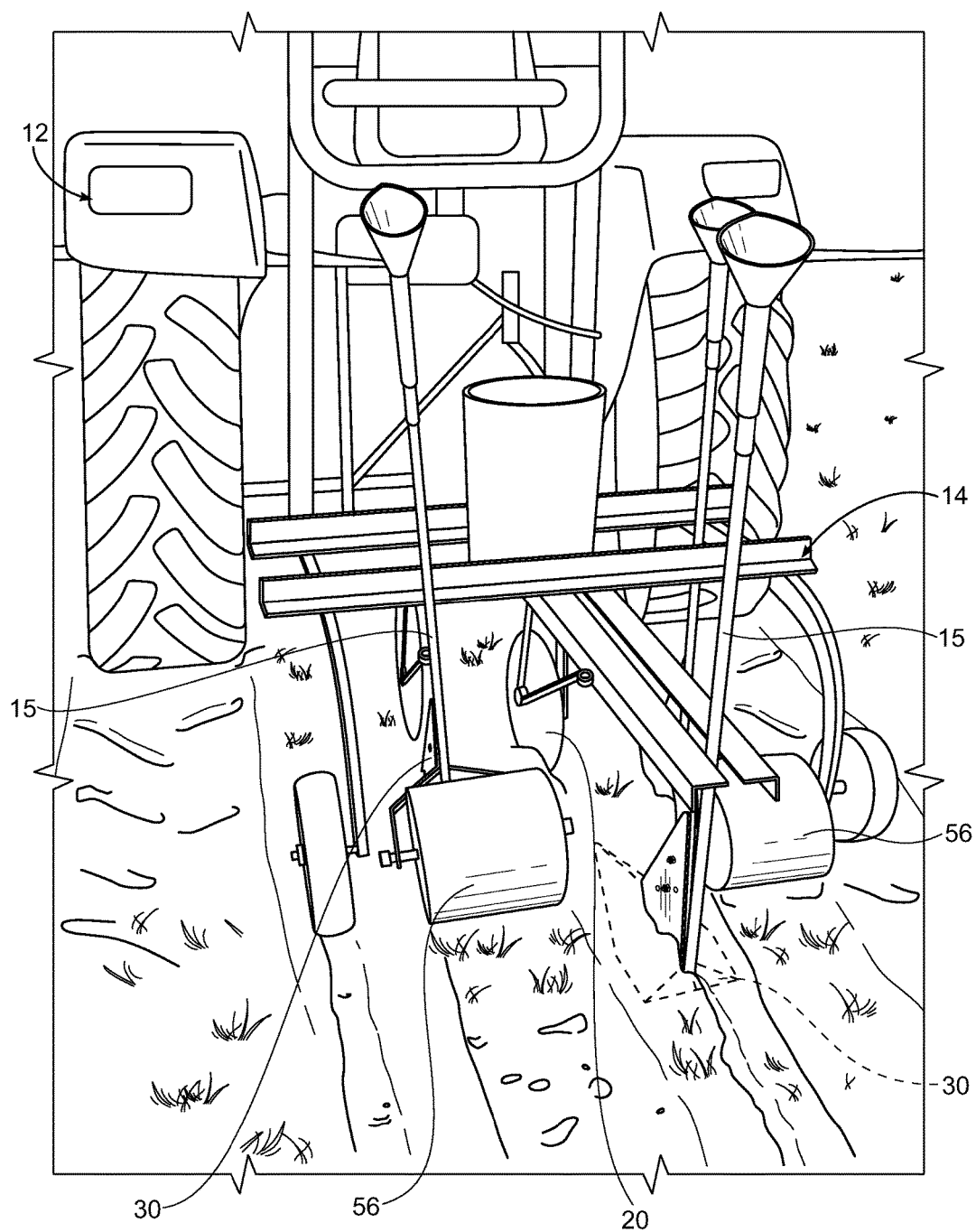
FIG. 15 is a perspective view of a seeding system in accordance with an example embodiment.
Figure 16:
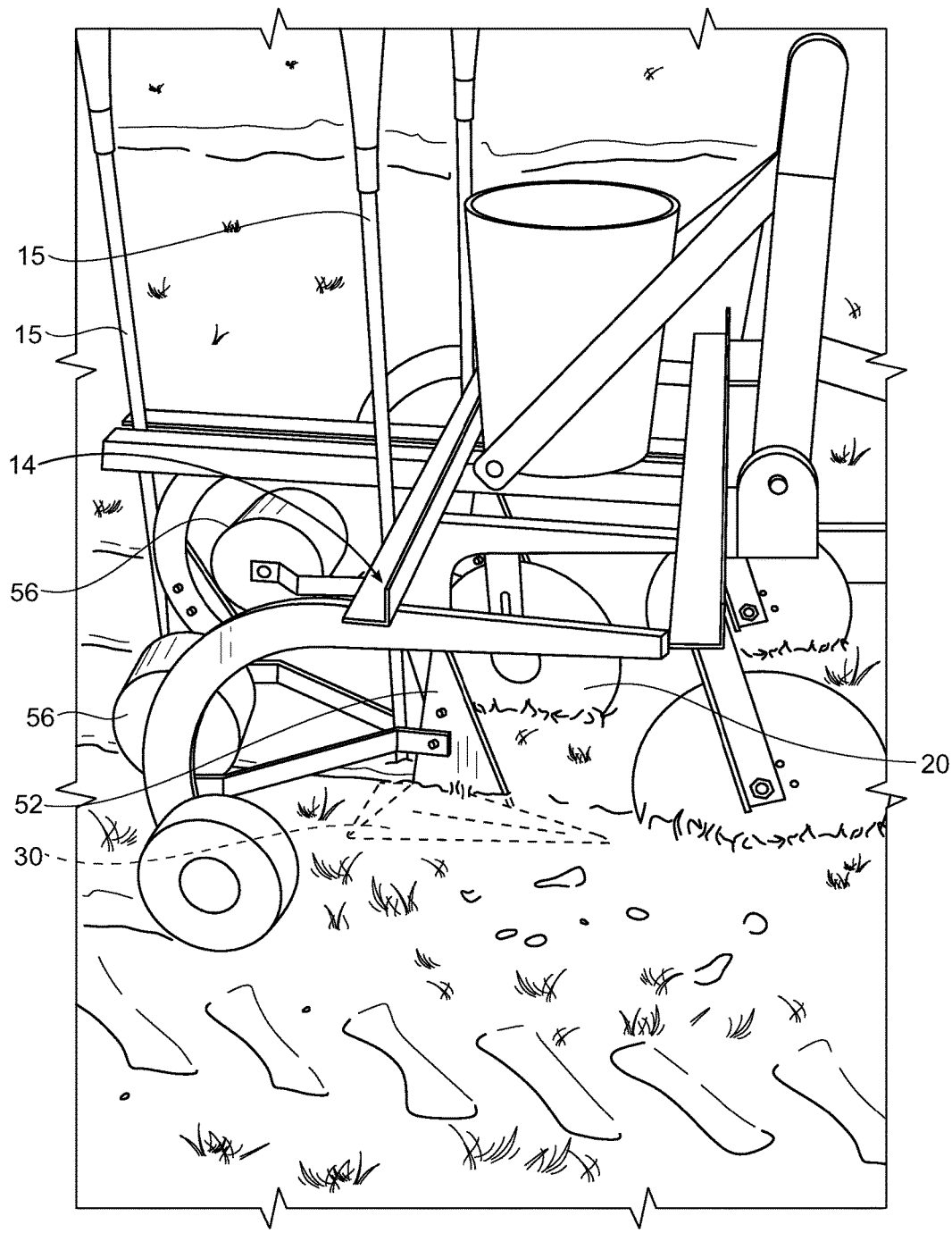
FIG. 16 is a side view of a seeding system in accordance with an example embodiment.
Figure 17:
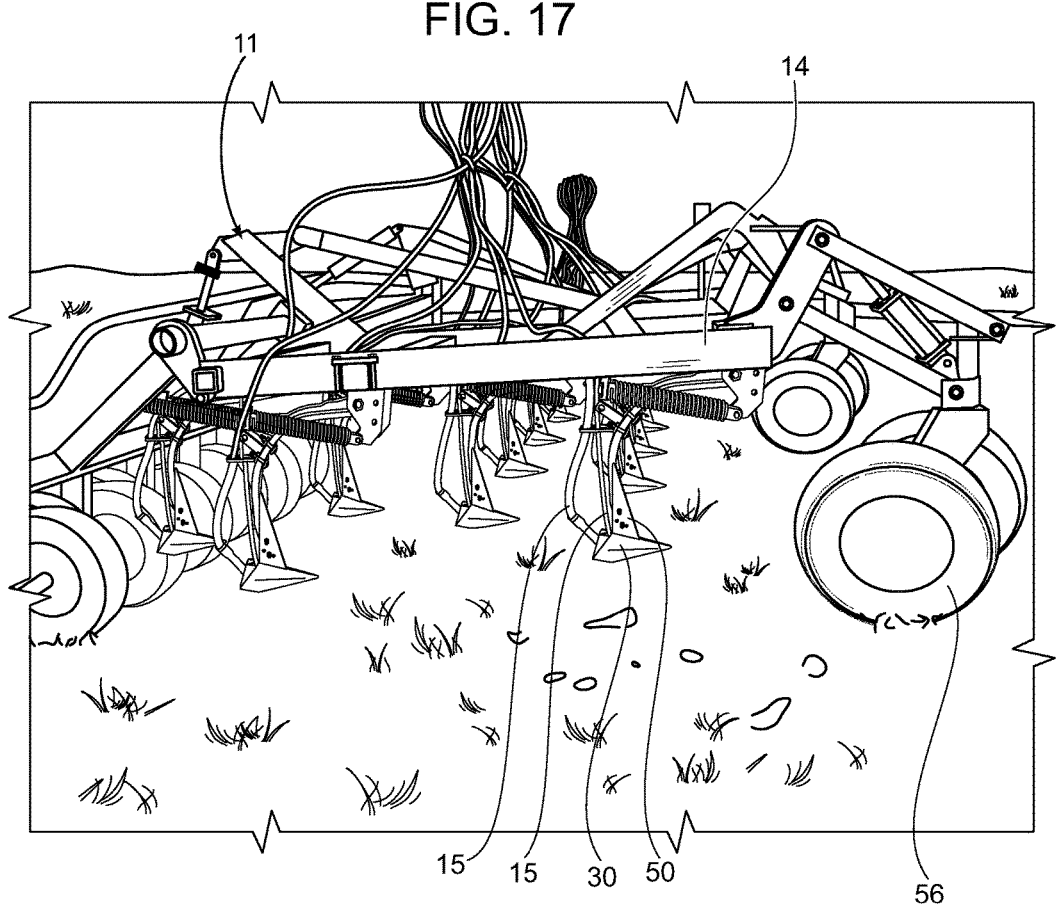
FIG. 17 is a side view of an alternate seeding system in accordance with an example embodiment.
Figure 18:
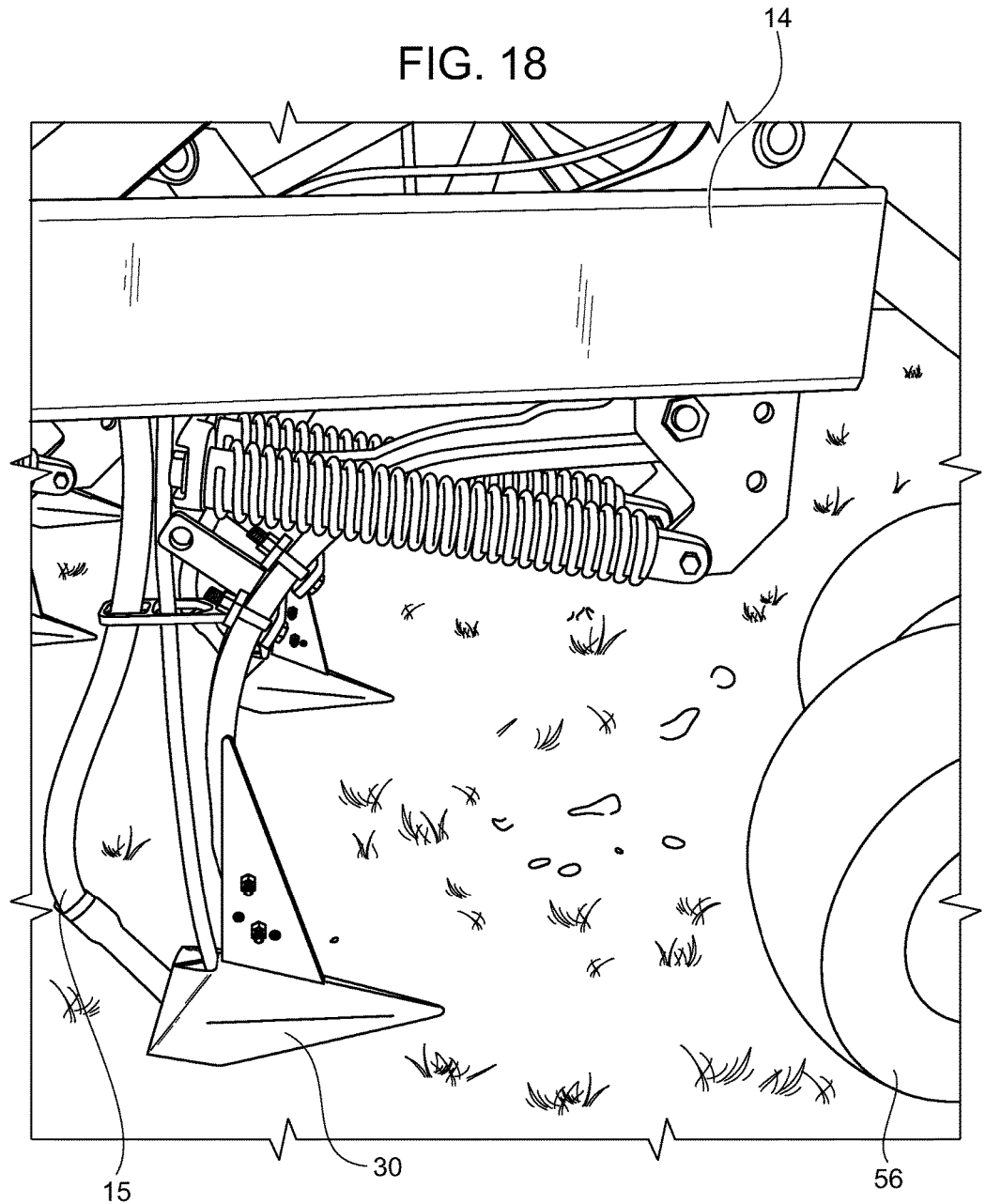
FIG. 18 is a side view of a cutter connected to an implement in accordance with an example embodiment.
Figure 19:
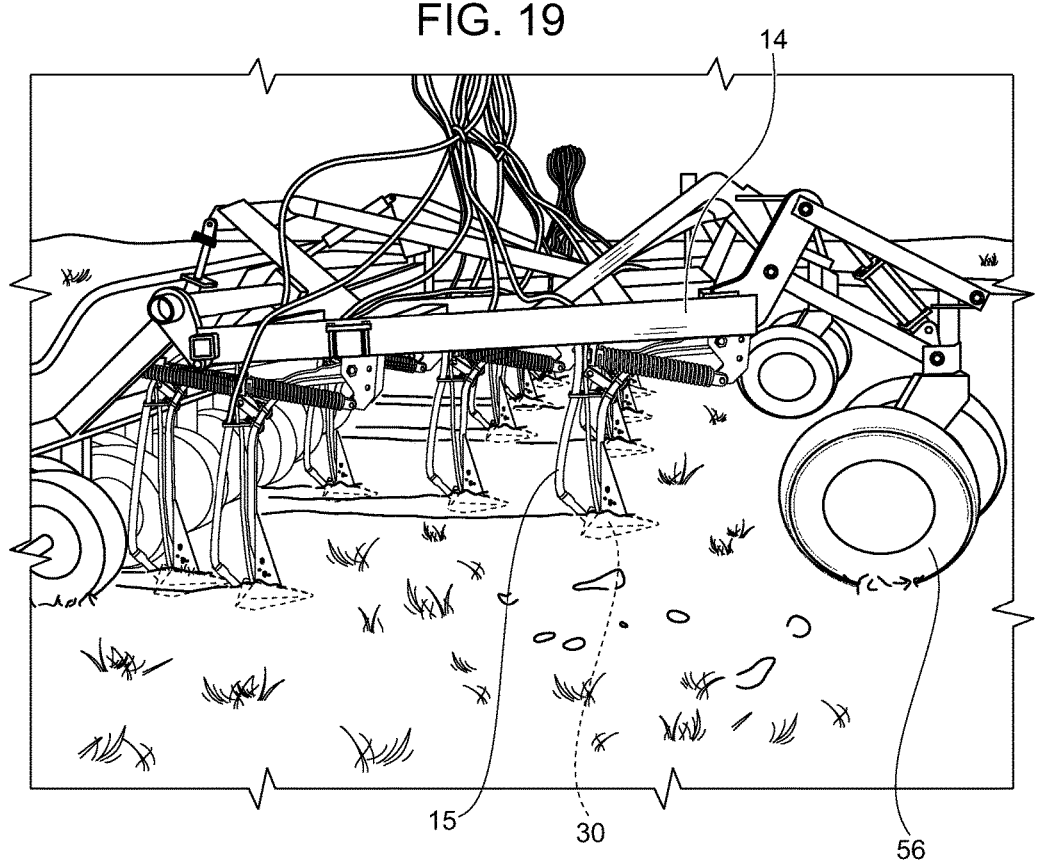
FIG. 19 is a side view of a cutter in use with a seeding system in accordance with an example embodiment.

The systems and methods described herein are useful for seeding systems 11 which are adapted to distribute a large amount of seeds 19 or other materials underneath a ground surface in an area. It should be appreciated that a wide range of seeding systems 11 may be utilized with the systems and methods described herein. A simplified, exemplary seeding system 11 is shown in FIGS. 15-16. A more conventional, industrial-type seeding system 11 including a tractor 12 towing an implement 14 is shown in FIGS. 17-19. Various other configurations may be utilized.

Figure 4:
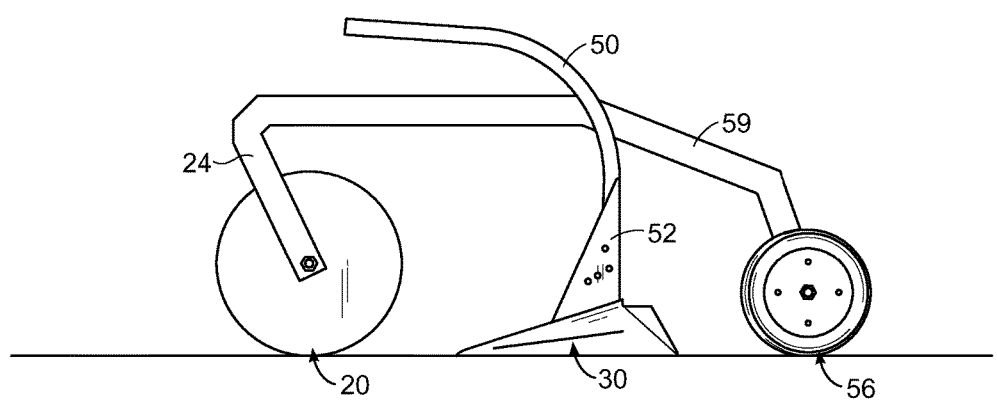
FIG. 4 is a side view of a ground cutting system in accordance with an example embodiment.

As shown in FIGS. 1 and 4, the seeding opener system 10 may include a seed disc opener 20. The seed disc opener 20 runs ahead of the cutter 30 and may be connected to the same implement 14. Seed disc openers 20 are known in the art, and any seed disc opener 20 known in the art may be utilized with the methods and systems described herein.

In the exemplary embodiment shown in FIG. 1, the seed disc opener 20 is illustrated as comprising a disc 22 which runs against the ground surface. A pair of legs 24 extend upwardly from the disc 22; with the legs 24 being connected to a seeding system 11, such as via an implement 14, by one or more brackets 26. The configuration of the seed disc opener 20 may vary in different embodiments and should not be construed as limited by the exemplary figures. In some embodiments, a seed disc opener 20 may be omitted.

Figure 7:
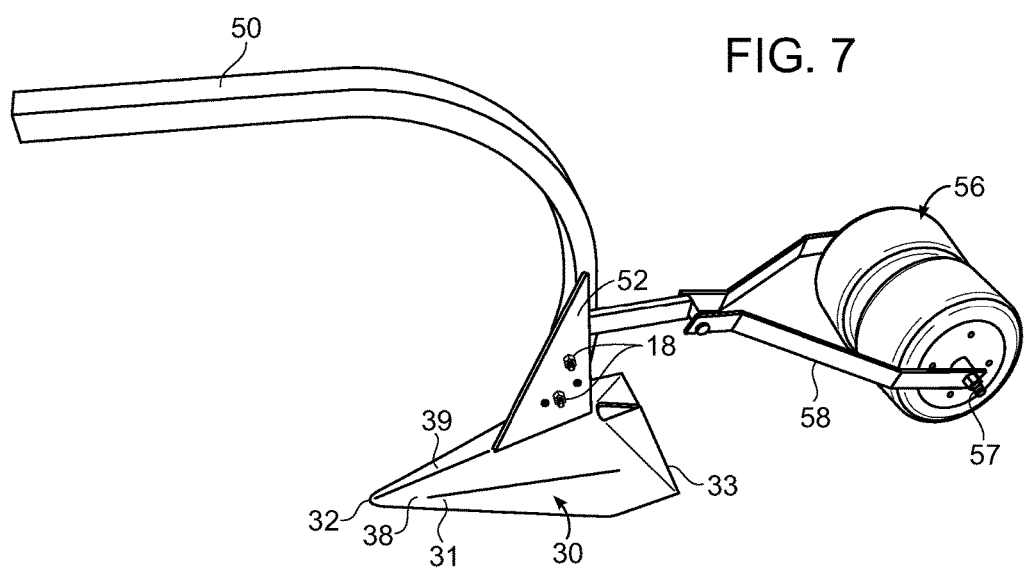
FIG. 7 is a side perspective view of a seeding system in accordance with an example embodiment.

The seeding opener system 10 may also include a wheel assembly 56 such as shown in FIGS. 1, 4, and 7. The wheel assembly 56 may be connected behind the cutter 30 such as shown in FIG. 1. The wheel assembly 56 may include one or more wheels which are rotatably connected to an axle 57. One or more wheel supports 58 may be utilized to connect the wheel assembly 56 to a linkage 59 or an implement 14.

The type, number, configuration, and spacing of the wheel assembly 56 may vary. In the exemplary figures, a pair of wheels are angled toward each other and supported on an axle 57. The wheel assembly 56 assists with traversing the ground surface so that the cutter 30 may be inserted within the ground surface to dispense seeds 19 or the like when in use.

C. Cutter

Figure 2:
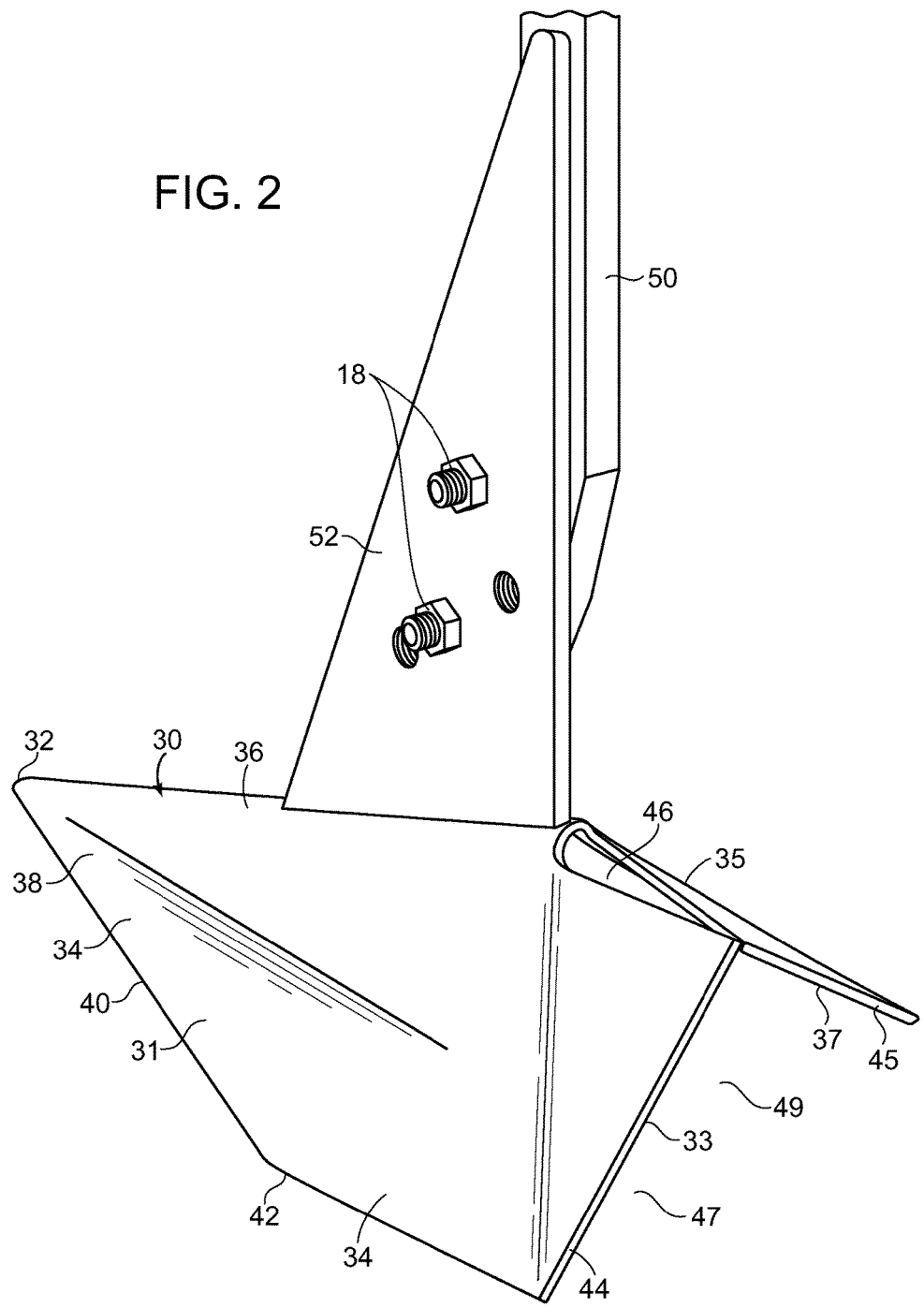
FIG. 2 is an upper perspective view of a cutter in accordance with an example embodiment.

As shown in FIG. 2, a cutter 30 may be utilized to cut beneath the ground surface for seeds 19 or other particulate materials to be inserted therein, such as by a seed drill. The cutter 30 may be connected as part of a larger seeding system 11 such as shown in FIGS. 15-19. The cutter 30 may be connected to an implement 14; with the implement 14 being driven by a tractor 12. Other configurations may also be utilized, including operation by hand.

Figure 3:
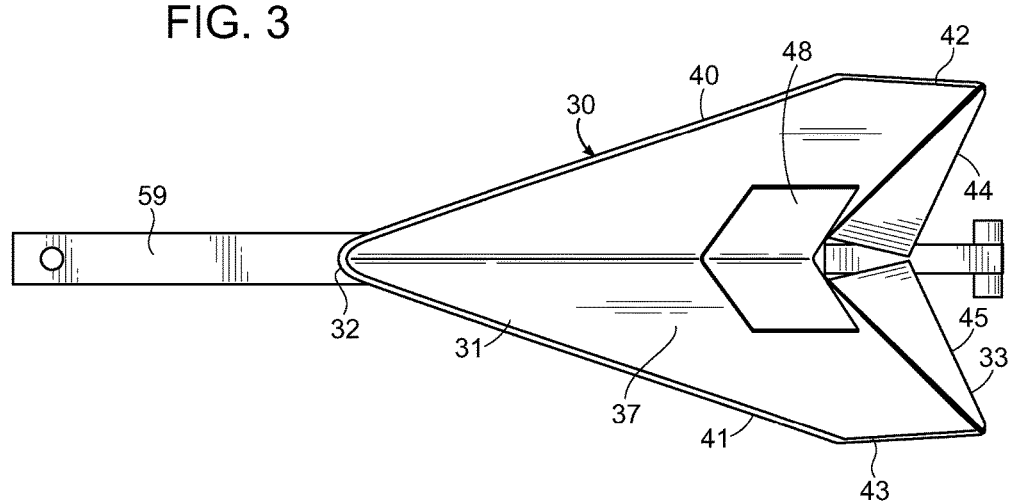
FIG. 3 is a bottom view of a cutter in accordance with an example embodiment.

As shown in FIGS. 8-14, the cutter 30 generally comprises a blade 31 having a front end 32, rear end 33, first side, 34, second side 35, upper end 36, and lower end 37. The front end 32 of the blade 31 may comprise a pointed end at the convergence of a first cutting edge 40 on the first side 34 of the blade 31 and a second cutting edge 41 on the second side 35 of the blade 31. The cutting edges 40, 41 may each be angularly or diagonally oriented to form a V-shape such as shown in FIG. 3. Such a configuration allows for the blade 31 to easily traverse beneath the ground surface when in use.

Figure 8:
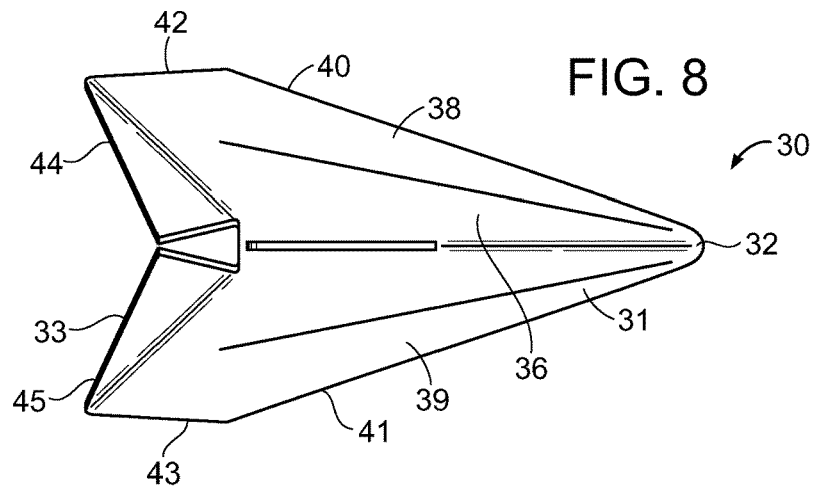
FIG. 8 is a top view of a cutter in accordance with an example embodiment.
Figure 9:
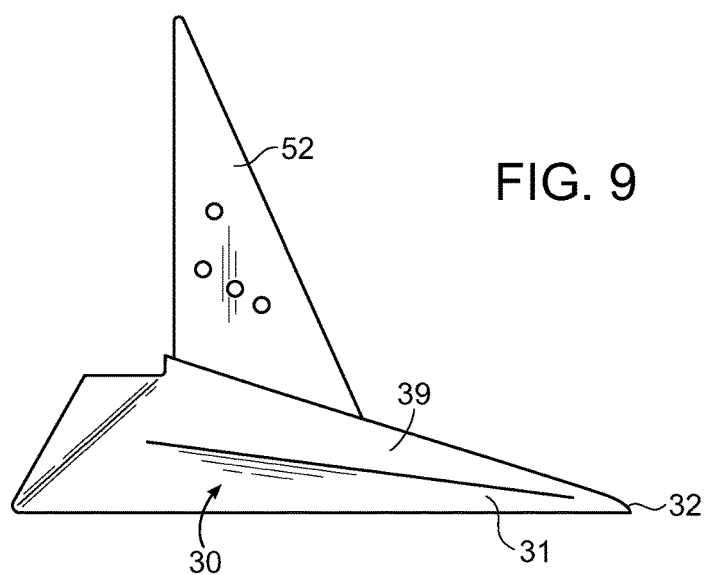
FIG. 9 is a first side view of a cutter in accordance with an example embodiment.
Figure 10:
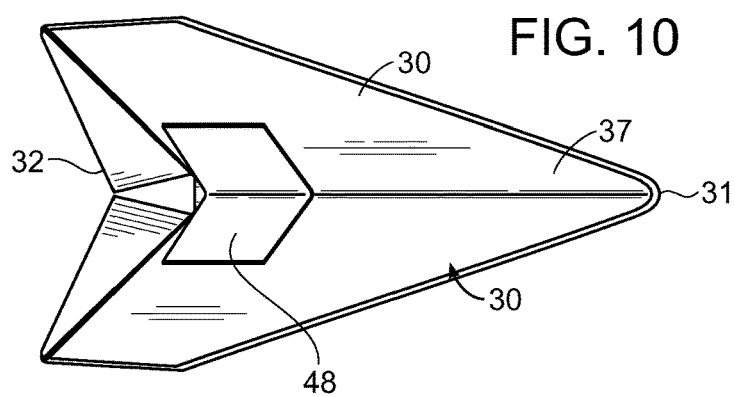
FIG. 10 is a bottom view of a cutter in accordance with an example embodiment.
Figure 11:
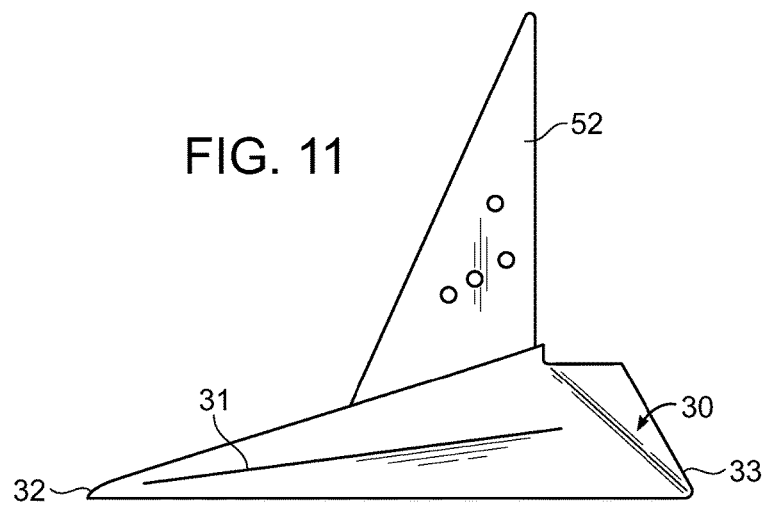
FIG. 11 is a second side view of a cutter in accordance with an example embodiment.
Figure 12:
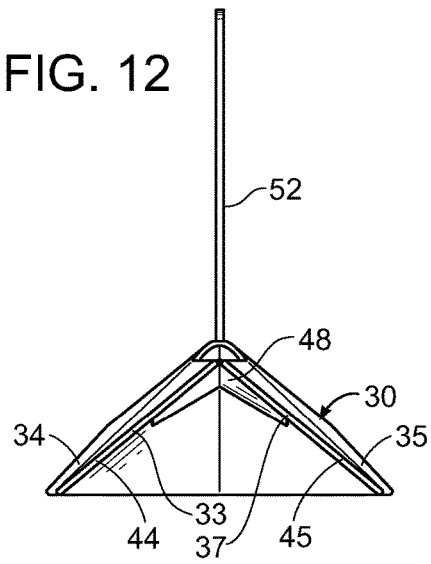
FIG. 12 is a rear view of a cutter in accordance with an example embodiment.
Figure 13:
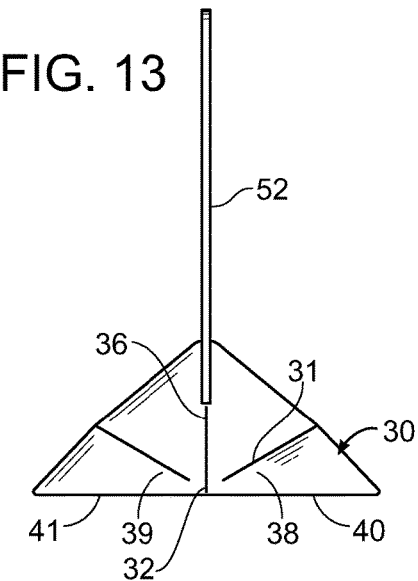
FIG. 13 is a frontal view of a cutter in accordance with an example embodiment.
Figure 14:
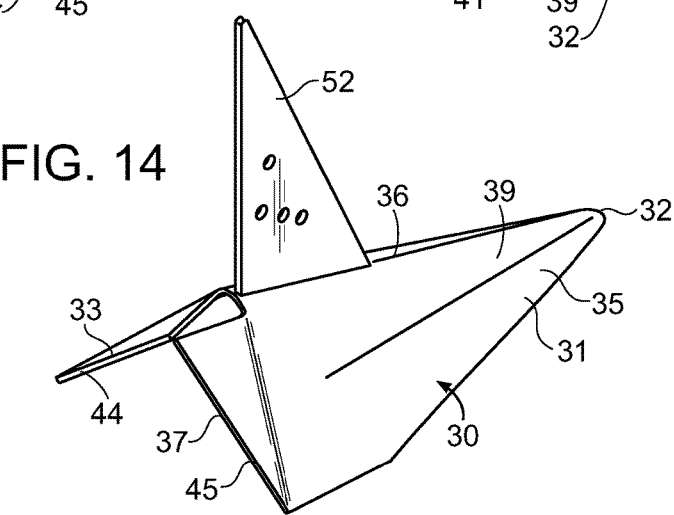
FIG. 14 is a rear upper perspective view of a cutter in accordance with an example embodiment.

As shown in FIG. 8, the front end 32 of the blade 31 may comprise a first front face 38 and a second front face 38. The first front face 38 may be comprised of a slanted, substantially triangular plate which includes the first cutting edge 40 of the blade 31. The second front face 39 may comprise a slanted, substantially triangular plate which includes the second cutting edge 41 of the blade 31. The front faces 38, 39 may be slanted with respect to each other so as to form a cavity 49 within the lower end 37 of the cutter 30 such as shown in FIG. 10. The first side 34 of the blade 31 may also include a first side edge 42 which is oriented at an obtuse angle with respect to the first cutting edge 40. Similarly, the second side 35 of the blade 31 may also include a second side edge 43 which is oriented at an obtuse angle with respect to the second cutting edge 41. In the exemplary embodiment of FIG. 8, the first cutting edge 40 and first side edge 42 form the first side 34 of the blade 31 and the second cutting edge 41 and second side edge 43 form the second side 35 of the blade 31. The first cutting edge 40 and first side edge 42 are formed at the outer edge of the first front face 38 of the blade 31 and the second cutting edge 41 and second side edge 43 are formed at the outer edge of the second front face 39 as shown in FIG. 10.

As best shown in FIG. 2, the rear end 33 of the blade 31 may comprise a first rear edge 44 and a second rear edge 45. The first and second rear edges 44, 45 may be cinched together (converge at a point) as shown in FIG. 2 so as to define a rear opening 47 between the first and second rear edges 44, 45 of the blade 31. This rear opening 47 may allow soil or other materials to backfill through the rear opening 47 as the blade 31 traverses beneath the ground surface. Conduits such as seed conduit 15 may also be inserted through the rear opening 47 at the rear end 33 of the blade 31.

As best shown in FIG. 2, the first and second rear edges 44, 45 form a V-shape which leads to a cavity 49 on the lower end 37 of the blade 31. In the embodiment shown in FIG. 2, the rear edges 44, 45 have been cinched together so as to form an upper opening 46 near the rear end 33 of the upper end 36 of the blade 31. The upper opening 46 leads to the cavity 49 formed on the lower end 37 of the blade 31. The upper opening 46 may accommodate a seed drill or the like which is adapted to drop seeds 19 or other particulate materials through the blade 31 as it traverses beneath the ground surface.

Figure 5:
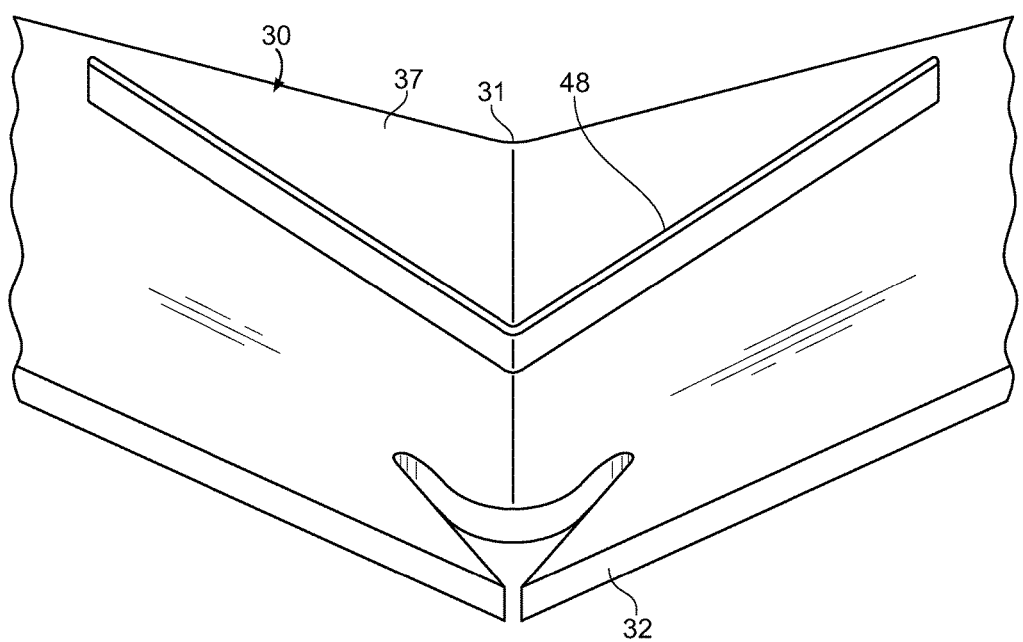
FIG. 5 is a bottom view of a cutter in accordance with an example embodiment.
Figure 6:
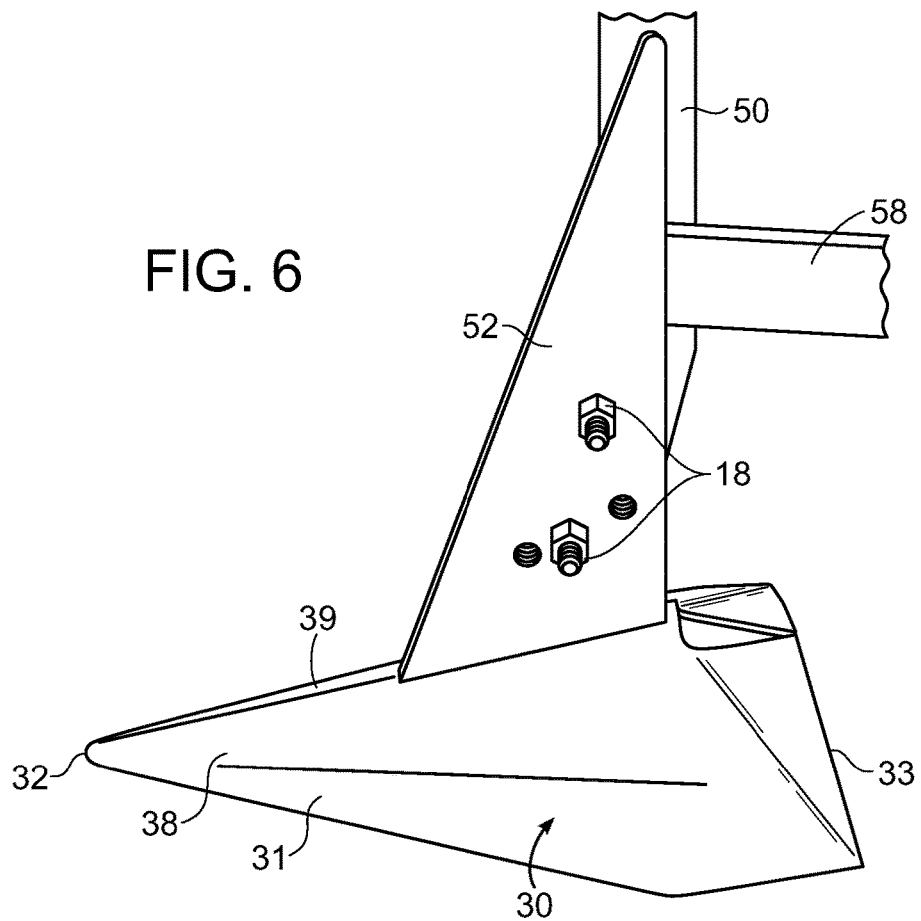
FIG. 6 is a side perspective view of a cutter in accordance with an example embodiment.

As best shown in FIGS. 5 and 10, a deflector 48 may be positioned on the lower end 37 of the blade 31 within the cavity 49. The deflector 48 may comprise various configurations and may be placed at various locations along the lower end 37 of the blade 31. In the embodiment shown in the figures, the deflector 48 is illustrated as comprising a V-shaped projection extending downwardly from the lower end 37 of the blade 31. The deflector 48 aids in deflecting and spreading seeds 19 or other particulate materials which are transferred into the blade 31, such as by a seed drill or seed conduit 15.

The deflector 48 is adapted to assist with distribution of seeds 19 after they enter the cutter 30, such as via the upper opening 46 through a seed drill or seed conduit 15. FIG. 5 illustrates the lower end 37 of the blade 31 and illustrates the positioning of the upper opening 46 with respect to the deflector 48. As can be seen, the deflector 48 is angled toward the upper opening 46 such that seeds 19 will be deflected toward either side 34, 35 of the blade 31 when in use. The seeds 19 may contact the deflector 48 and be driven in either of the two directions. As the blade 31 traverses the ground surface, the seeds 19 will naturally spread over the entire width of the cavity 49. The use of such a deflector 48 ensures an even spread and distribution of seeds 19 such that the seeds 19 don't clump up together when dropped.

D. Operation of Preferred Embodiment

In use, the cutter 30 may first be connected to a seeding system 11 to form the seeding opener system 10. FIGS. 15-16 illustrate the cutter 30 connected to a first type of seeding system 11. FIGS. 17-19 illustrate the cutter 30 connected to a second type of seeding system 11. In any case, the cutter 30 will generally be connected to the seeding system 11, such as via an implement 14 connected to a tractor 12, by the cutter mount 52 which extends upwardly from the upper end 36 of the cutter 30.

The cutter 30 may be connected beneath the implement 14. A seed disc opener 20 may be connected ahead of the cutter 30, such as in front of the front end 32 of the blade 31 as shown in FIG. 4. A wheel assembly 56 may be connected behind the cutter 30, such as behind the rear end 33 of the blade 31 such as shown in FIG. 4. A linkage 59 may interconnect the seed disc opener 20, cutter 30, and wheel support 58. Alternatively, such as shown in FIG. 7, a cutter support 50 may be connected to the cutter mount 52 and the linkage 59.

The cutter 30 will generally be positioned underneath a seeding system 11 above the ground surface. Preferably, the cutter 30 will be adjustable at least vertically such that the blade 31 may be lowered to a sufficient depth below the ground surface for distribution of seeds 19 or other particulates. The blade 31 may then be raised above the ground surface when not in use.

In systems 11 with multiple cutters 30, each blade 31 will preferably be individually adjustable. This will allow for versatility in the number of seeds 19 or other particulates distributed. It will also allow a deficient or damaged blade 31 to be kept out of service without affecting operation of the remaining blades 31. A source of seeds 19 or other particulates will generally be connected to the cutter 30 such that the seeds 19 or other particulates may be deposited underneath the blade 31 when in use. For example, a seed drill or seed conduit 15 may be connected through the upper opening 46 at the upper end 36 of the blade 31. Alternatively, or in addition to this configuration, a seed drill or seed conduit 15 may be connected through the rear opening 47 at the rear end 33 of the blade 31.

The source of seeds 19 will preferably be configured such that seeds 19 are deposited within the cavity 49 on the lower end 37 of the blade 31. When the blade 31 is traversing beneath the ground surface, seeds 19 may be periodically deposited underneath the blade 31 at a desired rate. The seeds 19 will be deposited beneath the ground surface, with the ground surface being minimally disturbed due to the shape, configuration, and depth of the blade 31 when in use.

In use, the blade 31 is first lowered to a desired depth below the ground surface. The seeding opener system 10 may then be activated to traverse the ground surface, such as via a tractor 12 pulling an implement 14. As the blade 31 traverses underneath the ground surface, seeds 19 or other particulates may be deposited under the blade 31 such as by a seed drill or seed conduit 15.

As each seed enters the blade 31, it will be deflected by the deflector 48 toward either the first side 34 or the second side 35 of the cutter 30. The deflector 48 may include a pair of angled members; with the first angled member angled toward the first side 34 of the blade 31 and the second angled member angled toward the second side 35 of the blade 31 such as shown in FIG. 8. Each seed will either be deflected by the first or second angled member toward either the first or second side 34, 35 of the blade 31 as it enters the lower end 37 of the blade 31. This will ensure an even spread and distribution of the seeds 19 being distributed by the seeding opener system 10.

Figure 20:
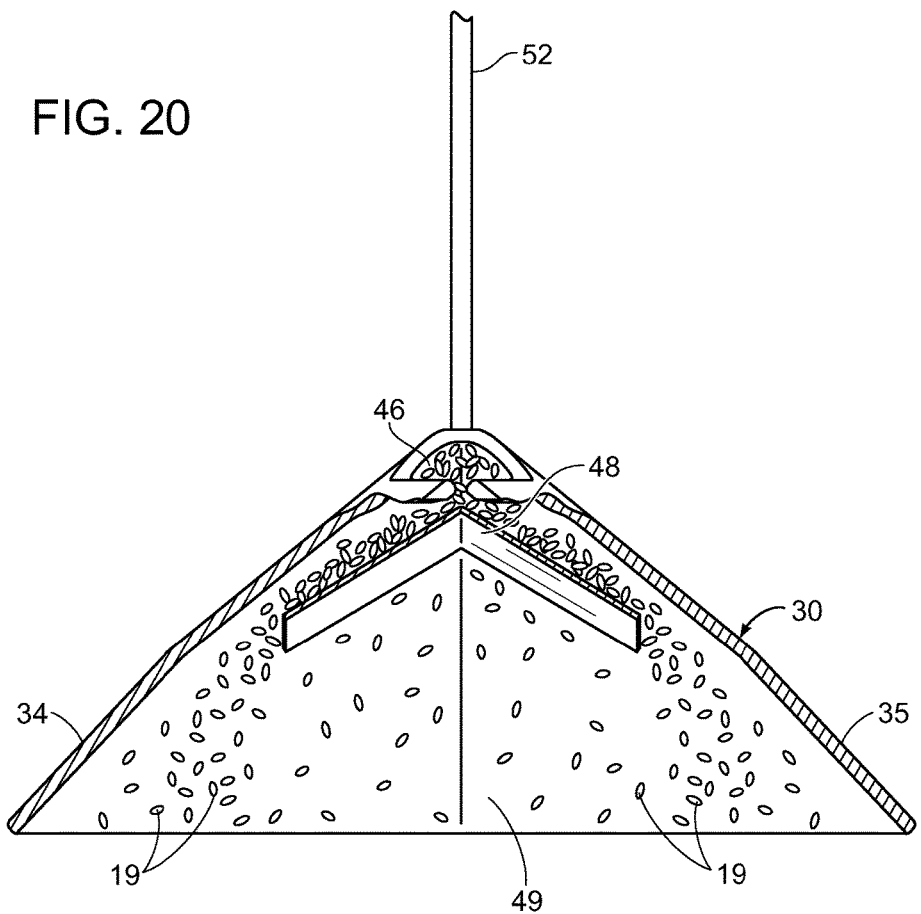
FIG. 20 is a sectional view of a cutter in use spreading seeds in accordance with an example embodiment.

FIG. 20 provides an exemplary view of distribution of seeds 19 underneath the cutter 30. Previous seeders have been known to only use up to 40% of the ground covered by the seeders. The use of deflectors 48 allows for 100% of the ground covered by the blade 31 to be seeded. As shown in FIG. 20, seeds 19 may be dispersed along the entire width of cavity 49 of the cutter 30 throughout the area underneath the ground surface being agitated by the blade 31.

As the blade 31 traverses beneath the ground surface, the ground surface will be minimally disturbed. FIGS. 16 and 19 illustrate this minimal disturbance, with only a thin line formed in the soil after seeding operations. This is in contrast the large disturbed areas of ground, including troughs that are formed by previous systems. The soil will naturally flow over the front faces 38, 39 of the blade 31 as the blade 31 cuts through the ground surface via its cutting edges 40, 41. The angled nature of the blade 31 will draw the soil toward the rear end 33 of the blade 31 to backfill through the rear opening 47; thus leaving only minimal soil disturbance.

Unless otherwise defined, all technical and scientific terms used herein have the same meaning as commonly understood by one of ordinary skill in the art to which this invention belongs. Although methods and materials similar to or equivalent to those described herein can be used in the practice or testing of the seeding opener system, suitable methods and materials are described above. All publications, patent applications, patents, and other references mentioned herein are incorporated by reference in their entirety to the extent allowed by applicable law and regulations. The seeding opener system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A cutter for a seeding system, comprising:
a blade comprising an upper end, a lower end, a front end, a rear end, a first side, and a second side, wherein the blade is adapted to be driven below a ground surface so as to cut the ground surface, wherein the rear end of the blade comprises a first rear edge and a second rear edge, the first rear edge and the second rear edge being cinched together so as to define an upper opening for receiving a seed conduit adapted to distribute a plurality of seeds;
a first front face near the first side of the blade, wherein the first front face extends from the front end of the blade toward the rear end of the blade;
a deflector on the lower end of the blade for deflecting seeds from the seed conduit toward either of the first side or second side of the blade, the deflector comprising a V-shaped projection extending downwardly from the lower end of the blade, wherein the deflector is angled toward the upper opening, wherein the deflector is positioned underneath the upper opening such that the plurality of seeds are deflected in one of a plurality of directions by the deflector;
wherein the first front face comprises a first cutting edge, the first cutting edge extending angularly along the first side of the blade;
a second front face near the second side of the blade, wherein the second front face extends from the front end of the blade toward the rear end of the blade; and
wherein the second front face comprises a second cutting edge, the second cutting edge extending angularly along the second side of the blade.

2. The cutter for a seeding system of claim 1, wherein the deflector is positioned midway between the first side and the second side of the blade.

3. The cutter for a seeding system of claim 1, wherein the first cutting edge converges with the second cutting edge to form a point.

4. The cutter for a seeding system of claim 1, comprising a first rear edge extending from the first side of the blade at the rear end of the blade.

5. The cutter for a seeding system of claim 4, comprising a second rear edge extending from the second side of the blade at the rear end of the blade.

6. The cutter for a seeding system of claim 5, wherein the first rear edge converges with the second rear edge to form a point.

7. The cutter for a seeding system of claim 6, wherein the blade comprises a rear opening defined by the first rear edge and the second rear edge.

8. The cutter for a seeding system of claim 1, wherein the first front face is substantially triangular and wherein the second front face is substantially triangular.

9. The cutter for a seeding system of claim 1, comprising a cutter support extending upwardly from the upper end of the blade.

10. The cutter for a seeding system of claim 9, wherein the blade is adapted to be fully submerged beneath the ground surface so as to cut into the ground surface.

11. A seeding system, comprising:
an implement adapted to traverse a ground surface;
a seed disc opener connected to the implement;
a seed conduit for distributing a plurality of seeds;
a cutter connected to the implement behind the seed disc opener, the cutter comprising:
a blade comprising an upper end, a lower end, a front end, a rear end, a first side, and a second side, wherein the blade is adapted to be driven below a ground surface so as to cut the ground surface, wherein the rear end of the blade comprises a first rear edge and a second rear edge, the first rear edge and the second rear edge being cinched together so as to define an upper opening for receiving a seed conduit adapted to distribute a plurality of seeds;
a first front face near the first side of the blade, wherein the first front face extends from the front end of the blade toward the rear end of the blade;
a deflector on the lower end of the blade for deflecting seeds from the seed conduit toward either of the first side or second side of the blade, the deflector comprising a first angled member angled toward the first side of the blade and a second angled member angled toward the second side of the blade, wherein the deflector comprises a first edge on the first angled member, a second edge on the second angled member, and a rear edge, wherein the deflector extends downwardly from the lower end of the blade, wherein the deflector is angled toward the upper opening, wherein the deflector is positioned underneath the upper opening such that the plurality of seeds are deflected in one of a plurality of directions by the deflector;
wherein the first front face comprises a first cutting edge, the first cutting edge extending angularly along the first side of the blade;
a second front face near the second side of the blade, wherein the second front face extends from the front end of the blade toward the rear end of the blade;
wherein the second front face comprises a second cutting edge, the second cutting edge extending angularly along the second side of the blade; and
a wheel assembly connected behind the cutter.

12. The seeding system of claim 11, wherein the & seed conduit is adapted to distribute a plurality of seeds beneath the lower end of the blade when the blade is submerged beneath the ground surface.

13. The seeding system of claim 11, wherein the blade comprises a rear opening defined by a first rear edge and a second rear edge of the blade.

* * * * *